(12) United States Patent
Guillez et al.

(10) Patent No.: US 7,077,455 B2
(45) Date of Patent: Jul. 18, 2006

(54) REAR SHELF FOR MOTOR VEHICLE EQUIPPED WITH A FOLDING ROOF

(75) Inventors: Jean-Marc Guillez, Cirieres (FR); Paul Queveau, Montravers (FR); Gérard Queveau, Le Pin (FR)

(73) Assignee: Societe Europeenne de Brevets Automobiles, Paris (FR)

( * ) Notice: Subject to any disclaimer, the term of this patent is extended or adjusted under 35 U.S.C. 154(b) by 50 days.

(21) Appl. No.: 10/502,076

(22) PCT Filed: Jan. 20, 2003

(86) PCT No.: PCT/FR03/00172

§ 371 (c)(1), (2), (4) Date: Jul. 19, 2004

(87) PCT Pub. No.: WO03/062002

PCT Pub. Date: Jul. 31, 2003

(65) Prior Publication Data

US 2005/0077751 A1    Apr. 14, 2005

(30) Foreign Application Priority Data

Jan. 21, 2002 (FR) .................................. 02 00719

(51) Int. Cl.
*B60J 7/00* (2006.01)
(52) U.S. Cl. .............................................. 296/107.08
(58) Field of Classification Search ........... 296/107.08, 296/136.04, 136.05, 136.06
See application file for complete search history.

(56) References Cited

U.S. PATENT DOCUMENTS

| | | | |
|---|---|---|---|
| 4,687,247 A * | 8/1987 | Muscat | 296/136.06 |
| 4,799,729 A * | 1/1989 | Muscat | 296/136.06 |
| 5,921,608 A | 7/1999 | Schmitt et al. | 296/107.08 |
| 5,967,593 A | 10/1999 | Schuler et al. | 296/136 |
| 6,318,792 B1 * | 11/2001 | Neubrand et al. | 296/107.08 |
| 6,364,396 B1 * | 4/2002 | Hayashi et al. | 296/136.06 |
| 6,454,343 B1 * | 9/2002 | Wagner et al. | 296/107.08 |
| 6,604,774 B1 * | 8/2003 | Koch et al. | 296/107.08 |
| 6,644,715 B1 * | 11/2003 | Bohnke | 296/107.08 |
| 6,682,149 B1 * | 1/2004 | Guillez et al. | 296/108 |

(Continued)

FOREIGN PATENT DOCUMENTS

| | | |
|---|---|---|
| DE | 39 39 145 A1 | 5/1991 |
| DE | 197 49 552 A1 | 5/1999 |
| DE | 298 12 165 U1 | 5/1999 |

(Continued)

*Primary Examiner*—H Gutman
(74) *Attorney, Agent, or Firm*—Nawrocki, Rooney & Sivertson, P.A.

(57) ABSTRACT

A motor vehicle roof can fold from a position of use to a retracted position in a rear boot of the motor vehicle. The roof has a central element and a pair of lateral elements, each rotatably attached at one of two transverse edges of the central element. A mechanism connected between each lateral element and the central element cooperates with features carried on a chassis of the vehicle to cause the lateral elements to rotate into an inclined position respective the central element as the roof folds into the retracted position. The mechanism also causes the lateral elements to rotate as the roof moves into the position of use.

2 Claims, 3 Drawing Sheets

U.S. PATENT DOCUMENTS

| | | | |
|---|---|---|---|
| 6,736,443 B1* | 5/2004 | Holst et al. | 296/107.08 |
| 2002/0041109 A1* | 4/2002 | Wagner et al. | 296/107.08 |
| 2003/0071479 A1* | 4/2003 | Schaller et al. | 296/136 |
| 2005/0012356 A1* | 1/2005 | Hesse | 296/107.08 |

FOREIGN PATENT DOCUMENTS

| | | |
|---|---|---|
| DE | 197 12 967 A1 | 10/1999 |
| EP | 1 038 710 A1 | 9/2000 |

* cited by examiner

REAR SHELF FOR MOTOR VEHICLE EQUIPPED WITH A FOLDING ROOF

BACKGROUND OF THE INVENTION

1. Field of the Invention

The present invention concerns a rear panel for a motor vehicle provided with a roof which can be folded in its rear boot, more particularly for such a vehicle comprising means able to make the said panel pass from a position of use in which it is disposed generally substantially horizontally between a chassis element of the vehicle and the front edge of a lid of the said boot, and a retracted position in which it is disposed generally substantially vertical so as to leave clear a passage space for the said roof between the said chassis element and the said edge.

2. Description of the Prior Art

Such rear panels are already known which pivot from the position of use to the retracted position for the entry or exit of the roof in the rear boot.

One problem is however posed because, when the panel passes from one position to the other, its lateral edges may be interfered with by the internal trim of the rear part of the roof.

Because of this it was proposed in the documents DE 197 49 552 and U.S. Pat. No. 5,921,608 to produce panels of this type comprising:

a central element able to adopt the said positions;

two lateral elements.

More particularly in the first of the aforementioned documents, the lateral elements are each articulated on a transverse edge of the said central element about a substantially longitudinal shaft.

However, the control mechanisms for the lateral elements are complex and not very satisfactory.

The present document aims to mitigate this drawback.

BRIEF SUMMARY OF THE INVENTION

More particularly, the present invention aims to provide a rear panel for a vehicle provided with a folding roof in which means are provided for retracting its lateral edges when it passes from one position to another.

To this end, a first object of the invention is a rear panel for a motor vehicle provided with a roof which can be folded in its rear boot and means able to make the said panel pass from a position of use in which it is disposed generally substantially horizontally between an element of the vehicle chassis and the front edge of a lid of the said boot to a retracted position where it is disposed generally substantially vertically so as to leave clear a passage space for the said roof between the said chassis element and the said front edge, the said panel comprising:

a central element able to adopt the said positions;

two lateral elements each articulated at a transverse edge of the said central element (5) about a substantially longitudinal shaft;

characterised by the fact that it comprises:

two cam followers each fixed to one of the said lateral elements and able to cooperate each with a cam track fixed to the said chassis;

elastic means between the said central element and the said lateral elements able to apply the said cam followers to the said cam tracks;

the said cam followers, cam tracks and elastic means being arranged so as to dispose the said lateral elements generally in the plane of the said central element when the panel is in a position of use and to incline the said lateral elements with respect to the said central element when the panel is in the retracted position.

Thus, when the central element of the panel passes into the retracted position, its lateral elements pivot in a simple fashion with respect to the longitudinal axis in order to incline them with respect to the central element and thus leave clear the passage for the internal trim of the roof.

The lateral elements of the panel can pivot either upwards or downwards with respect to their position of use according to the spaces available in the vehicle and the particular kinematics of the panel.

Another object of the invention is a motor vehicle comprising a rear panel as described above.

BRIEF DESCRIPTION OF THE SEVERAL VIEWS OF DRAWINGS

Two embodiments of the invention will now be described by way of non-limiting example with reference to the accompanying schematic drawings, in which.

DETAILED DESCRIPTION OF THE INVENTION

Figure 1:
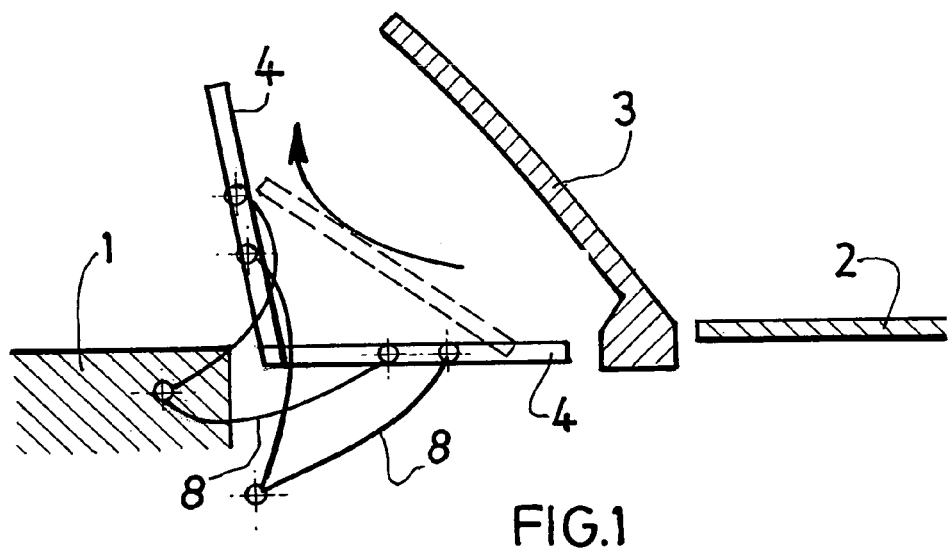
FIG. 1 is a partial view in longitudinal section of a vehicle provided with a folding roof, the panel being produced according to a first embodiment.

As shown in FIG. 1, a vehicle with a folding roof comprises a chassis 1, a rear boot lid 2 and a rear panel 4 longitudinally joining the rear edge of the chassis 1 to the front edge of the lid 2.

Longitudinally means the front/rear direction of the vehicle.

The roof of the vehicle is composed of a plurality of elements, only the rear element 3 of which is shown. In the position in which the vehicle roof covers the cabin, the rear edge of the roof arrives level with the junction between the rear edge of the panel 4 and the front edge of the lid 2.

To allow the folding of the roof in the rear boot, the panel 4 is tilted into a substantially vertical position and the front part of the lid 2 is raised.

The rear panel 4 comprises a central element 5 and two lateral elements 6 articulated on the central element about a longitudinal shaft 7.

The articulation about the shafts 7 allows a movement upwards (FIGS. 1 to 3) or downwards (FIG. 4) of the lateral elements 6 with respect to the central element 5.

Figure 2A:
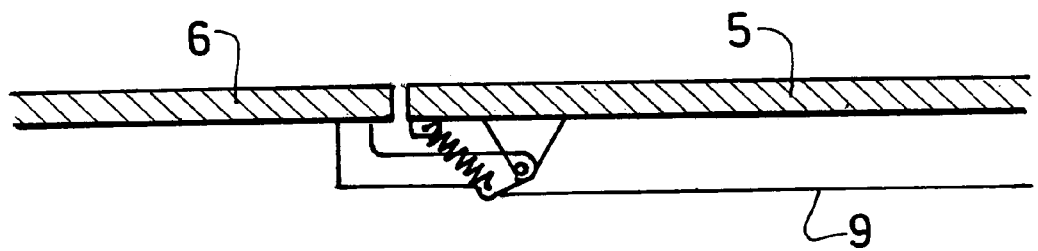
FIGS. 2a and 2b are half-views in transverse section of a vehicle provided with a panel according to the first embodiment, the panel being respectively in the position of use and in the retracted position.
Figure 2B:
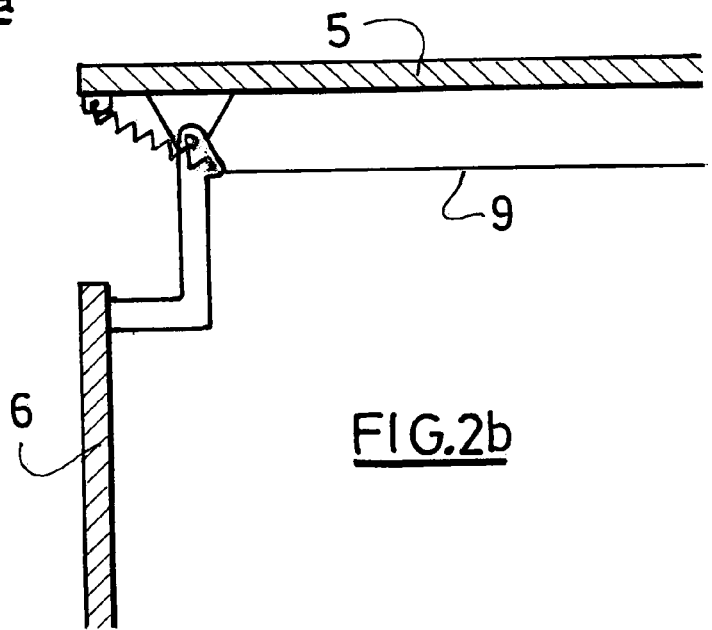
Figure 3A:
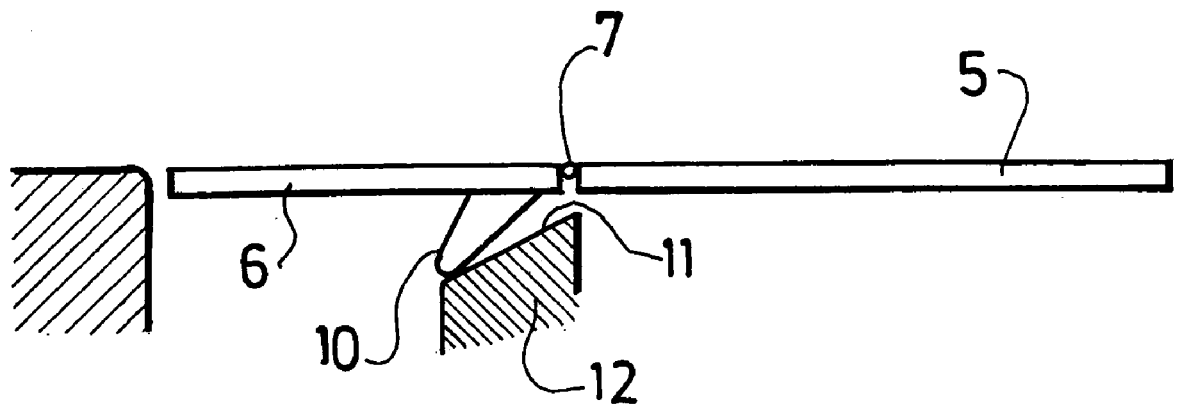
FIGS. 3a and 3b are views similar to FIG. 2, the panel being respectively in the position of use and in the retracted position, the said panel being produced according to a variant of the first embodiment.
Figure 3B:
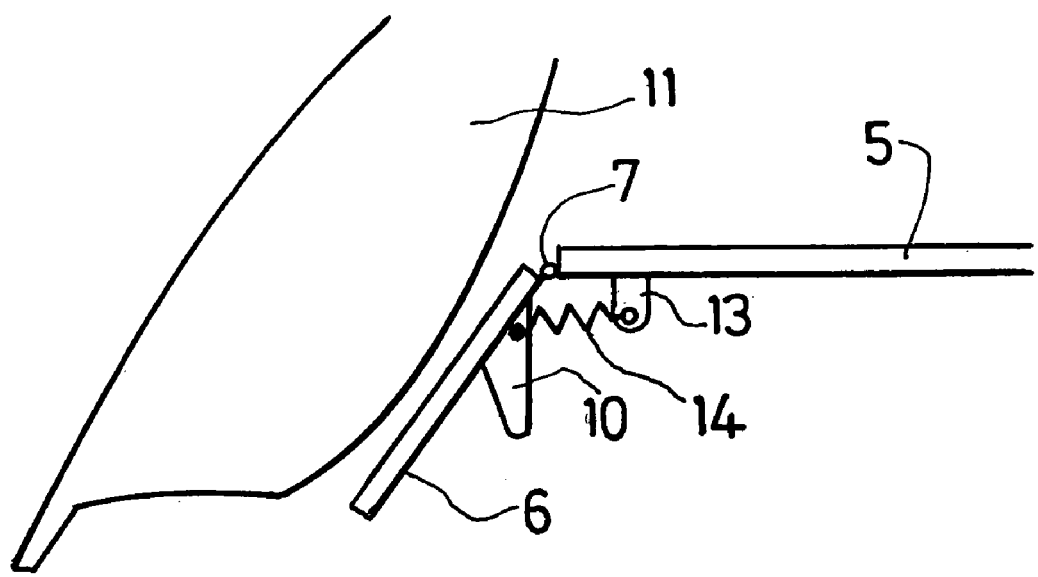

According to the first embodiment, illustrated by FIGS. 1 to 3, the lateral elements 6 are retracted towards the bottom of the vehicle, so that it is not necessary to withdraw the roof before the panel 4 is moved.

To this end, according to a first variant, illustrated by FIGS. 1 and 2, articulated arms 8 are provided, fixed by one end to the panel 4 and by the other end to the chassis 1. A linkage 9 directly mounted on these arms 8 (FIG. 2) makes it possible, by means of a system of connecting rods (not shown), to make the lateral elements 6 pivot downwards.

According to a second variant of the first embodiment (FIG. 3), the downward pivoting of the lateral elements 6 is achieved by means of a lug 10 fixed to the lateral elements 6. This lug 10 constitutes a cam follower able to cooperate with a cam track 11 situated on a support 12 fixed to the chassis 1.

A spring 14 disposed between the lug 10 and a lug 13 situated on the central element 5 of the panel is arranged so as to cause such a pivoting.

Figure 4A:
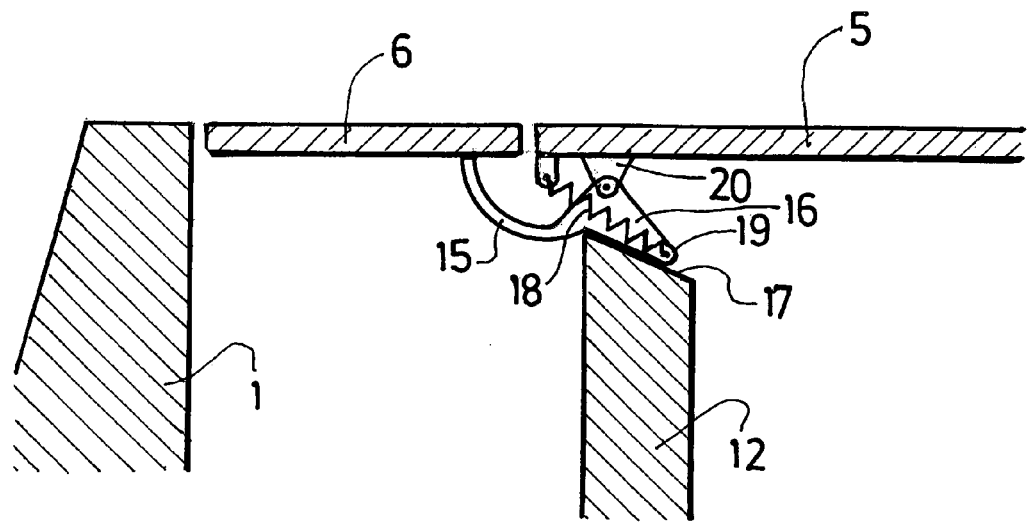
FIGS. 4a and 4b are half-views in transverse section of a vehicle provided with the panel according to a second embodiment, the said panel being respectively in the position of use and in the retracted position.
Figure 4B:
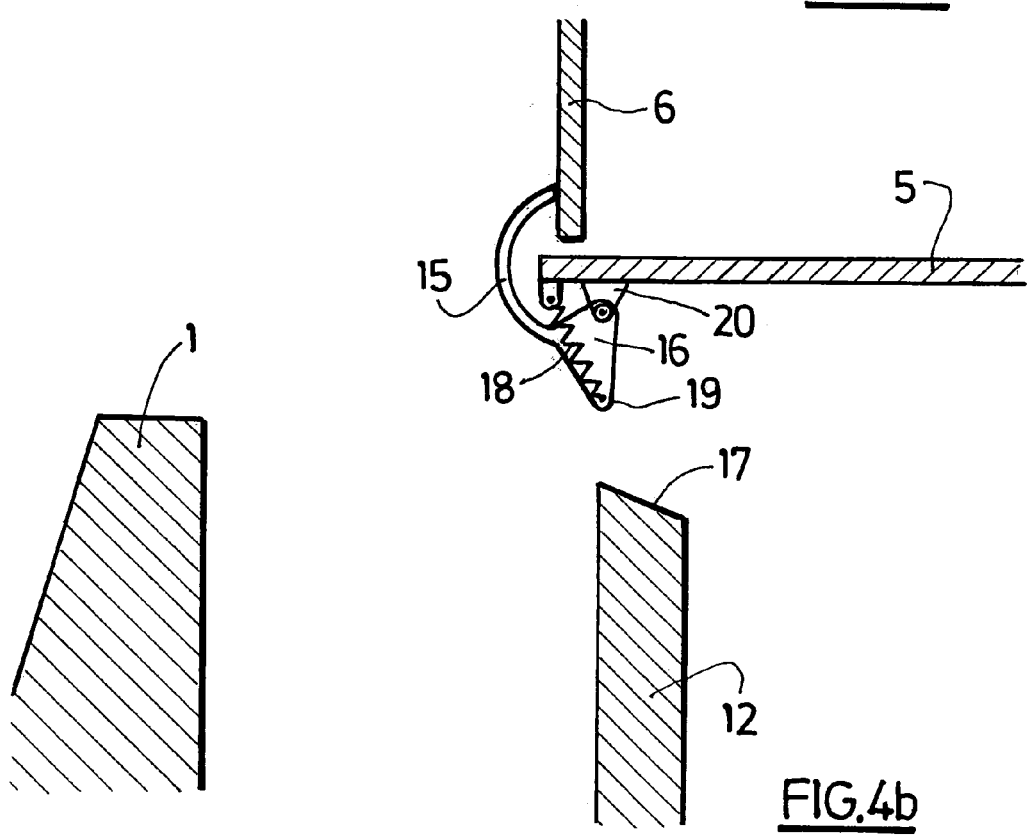

According to a second embodiment, illustrated by FIGS. 4a and 4b, the lateral elements 6 are retracted towards the top of the vehicle, so that it is necessary to withdraw the roof by any suitable means prior to the movement of the panel 4.

To this end, the lateral elements 6 are provided with a cam follower 15 in the form of a swan neck, the end of which is mounted so as to pivot rotationally on the central element 5 of the panel 4. This cam follower 15 is arranged so as to cooperate with a cam track 17 situated on the support 12 fixed to the chassis 1.

A return spring 18 is fixed on the one hand to the nose 19 of the cam follower 15 and on the other hand to a lug 20 situated on the panel. This spring 18 makes it possible to apply the nose 19 of the cam follower 15 to the cam track 17, when the panel 4 is in a position of use (FIG. 4a). Then, when the panel 4 is raised, the spring 18 drives the nose 19 of the cam follower 15 upwards, this movement causing the lifting of the lateral element 6 and its pivoting with respect to the central element 5.

Known means (not shown) are provided to make the central element 5 of the panel pass from its position of use depicted in FIGS. 2a, 3a and 4a where it provides the join between the chassis 1 of the vehicle and the front edge of the rear boot lid, to a retracted position in which it leaves free passage for the roof elements between the chassis and the said front edge.

The invention claimed is:

1. A rear panel (4) for a motor vehicle having a chassis, and provided with a roof which can be folded in a rear boot of the chassis and with means to make the panel (4) pass from a position of use in which the panel (4) is disposed generally horizontally between an element of the vehicle chassis and the front edge of a lid of the boot to a retracted position where it is disposed generally substantially vertically so as to leave clear a passage space for the roof between the chassis element and the lid's front edge, the panel comprising:

a central element (5) able to adopt the position of use and the retracted position;

two lateral elements (6), each articulated at a transverse edge of the central element (5) about a substantially longitudinal shaft (7);

characterised by the fact that comprises each lateral element includes:

a cam follower (10, 15) fixed to the lateral element (6) and cooperating with a cam track (11, 17) fixed to the chassis; and elastic means (18) connected between the central element (5) and each lateral element (6), said elastic means forcing the cam followers (10, 15) against the cam tracks (11, 17); wherein, the cam followers, cam tracks and elastic means cooperate to dispose the lateral elements (6) generally in the plane of the central element (5) when the panel (4) is in the position of use and to incline the lateral elements (6) with respect to the central element (5) when the panel (4) is in the retracted position.

2. A motor vehicle, characterised by a rear panel (4) according to claim 1.

* * * * *